(12) United States Patent
Feilner (10) Patent No.: US 6,177,639 B1
(45) Date of Patent: Jan. 23, 2001

(54) SWING AND ROLL LOAD CELL MOUNT FOR A WEIGH SCALE

(76) Inventor: Glenn R. Feilner, 5035 S. 174th St., Omaha, NE (US) 68135

(*) Notice: Under 35 U.S.C. 154(b), the term of this patent shall be extended for 0 days.

(21) Appl. No.: 09/288,607

(22) Filed: Apr. 9, 1999

(51) Int. Cl.[7] .......................... G01G 19/02; G01G 21/24
(52) U.S. Cl. ..................... 177/134; 177/255; 177/DIG. 9
(58) Field of Search .................................. 177/132, 133, 177/134, 255, DIG. 9

(56) References Cited

U.S. PATENT DOCUMENTS

| | | | |
|---|---|---|---|
| 3,797,593 | 3/1974 | Conley | 177/134 |
| 4,066,140 | 1/1978 | Conley | 177/134 |
| 4,248,317 | 2/1981 | Rahav | 177/134 |
| 4,280,576 | 7/1981 | Smith, Jr. | 177/126 |
| 4,516,645 | 5/1985 | Wetzel | 177/147 |
| 4,549,622 | 10/1985 | Leiman | 177/134 |
| 4,601,356 | 7/1986 | Muccillo, Jr. | 177/132 |
| 4,627,507 | 12/1986 | Powell et al. | 177/255 |
| 4,828,055 | 5/1989 | Hamilton et al. | 177/134 |
| 4,955,441 | 9/1990 | Mills et al. | 177/255 |
| 6,046,412 | * 2/2000 | Rockwell | 177/133 |

FOREIGN PATENT DOCUMENTS 0 161 103 A2   11/1985   (EP) .

* cited by examiner

Primary Examiner—Randy W. Gibson
(74) Attorney, Agent, or Firm—Rothwell, Figg, Ernst & Manbeck (57) ABSTRACT

A swing and roll load cell mount for a weigh scale is provided, including a weigh bridge, a saddle mounted to the weigh bridge, the saddle having an upper surface adapted for attachment to the weigh bridge, and having a pair of downwardly extending arms having substantially semi-circular cut-outs in bottom edges of the arms, a bottom pin on which the cut-outs of the arms rest, the arms being freely rotatable on the bottom pin, a pair of link plates having a top hole and a bottom hole, with the bottom pin extending through the bottom hole of the pair of link plates and being freely rotatable within the link plates, with the link plates being spaced apart, a top pin extending through the top hole of the pair of link plates and being freely rotatable within the link plates, a base, and a compression type load cell mounted on the base and having a substantially hourglass shaped medial groove, with the top pin resting in the medial groove of the load cell and the bottom pin passing below the load cell, wherein the saddle is supported in a manner that allows the saddle to swing longitudinally on a combination of the top and bottom pins and the pair of link plates, and further allows the top pin to roll transversely on the medial groove of the load cell.

16 Claims, 6 Drawing Sheets

SWING AND ROLL LOAD CELL MOUNT FOR A WEIGH SCALE

BACKGROUND OF THE INVENTION

1. Field of the Invention

The present invention relates generally to the field of load cell mounts.

2. Description of the Background Art

Scales are devices that are used to determine a weight of an object by measuring the gravitational pull exerted on that object. Scales are commonly used to determine the physical amount or quantity of an item, such as a foodstuff, for example. Scales are therefore a necessary component of commerce, and aid in the smooth flow of commerce by ensuring fairness and accuracy in any transactions requiring a weight or amount measurement.

Modern scales have benefitted greatly from improvements in technology. One device that has revolutionized scales is the load cell. Load cells are widely used in scales designed to weigh large quantities, such as scales for weighing trucks, train cars, tanks, hoppers, or other large loads or machinery. A load cell is a piece of steel that contains a strain gauge. The strain gauge is an electronic transducer that changes resistance when it is stressed. It measures a strain imposed on the load cell by measuring an almost imperceptible deformation of the load cell under a load. Typically, in a load cell multiple strain gauges are connected in a Wheatstone bridge configuration. When an input voltage is applied to the bridge, the bridge outputs a voltage proportional to the force on the load cell. By varying the size and strength of the steel comprising the load cell body, the load cell can be designed to accommodate different load capacities.

One type of load cell is a shear or shear beam type (also referred to as compression type) load cell. This type of load cell is a device that is placed horizontally under a load, with the force of the scale directed onto a small area, or "sweet spot," on the top of the load cell.

In use, multiple load cells may be used in a scale application. Multiple load cells may be placed under a weigh bridge of a scale, and the outputs of all load cells may be summed to provide a total weight of the weight bridge and load.

Load cells offer several advantages over the traditional mechanical scale apparatus. Because load cells are electronic, they can provide an electronic output and can be calibrated electronically, with no moving parts to wear out. Load cells are resistant to dirt and moisture.

In scale applications, load cells are only a component, and must be mounted within the scale so as to receive the full weight of the scale and the load. In order to generate accurate readings, the weight must be imparted to the load cell with only a vertical force component, and with no horizontal force component. This means that any horizontal motion or sway must be reduced or eliminated. One of the biggest drawbacks of related art load cell mounts is the inability to accommodate and minimize motion of the weigh bridge relative to the load cell. In related art load cell mounts, external devices were employed in order to limit or reduce sway of the weigh bridge due to movement of a vehicle onto the weigh bridge. These external devices often took the form of bumpers that limited sway. In an effort to solve this problem, one related art mount employed a pivoting mount that pivoted on the top surface of the load cell (U.S. Pat. No. 4,549,622 to Leiman). Unfortunately, the Leiman load cell mount thereby imparted a torsional force to the load cell, with the resulting torsional force affecting the accuracy of measurements.

There remains a need in the art for improvements in load cell mounts.

SUMMARY OF THE INVENTION

A swing and roll load cell mount for a weigh scale is provided according to a first aspect of the invention. The swing and roll load cell mount comprises a weigh bridge, a saddle mounted to the weigh bridge, the saddle having an upper surface adapted for attachment to the weigh bridge, and having a pair of downwardly extending arms having substantially semi-circular cut-outs in bottom edges of the arms, a bottom pin on which the cut-outs of the arms rest, the arms being freely rotatable on the bottom pin, a pair of link plates having a top hole and a bottom hole, with the bottom pin extending through the bottom hole of the pair of link plates and being freely rotatable within the link plates, with the link plates being spaced apart, a top pin, the top pin extending through the top hole of the pair of link plates and being freely rotatable within the link plates, a base, and a compression type load cell mounted on the base and having a substantially hourglass shaped medial groove, with the top pin resting in the medial groove of the load cell and the bottom pin passing below the load cell, wherein the saddle is supported in a manner that allows the saddle and the weigh bridge to swing longitudinally on a combination of the top and bottom pins and the pair of link plates, and further allows the top pin to roll transversely on the medial groove of the load cell while maintaining a load force in a substantially centered position on the load cell.

A swing and roll load cell mount for a weigh scale is provided according to a second aspect of the invention. The swing and roll load cell mount comprises a weigh bridge, a saddle mounted to the weigh bridge, the saddle having an upper surface adapted for attachment to the weigh bridge, and having a pair of downwardly extending arms having substantially semi-circular cut-outs in bottom edges of the arms, a bottom pin on which the cut-outs of the arms rest, the arms being freely rotatable on the bottom pin, a pair of link plates having a top hole and a bottom hole, with the bottom pin extending through the bottom hole of the pair of link plates and being freely rotatable within the link plates, with the link plates being spaced apart, a top pin, the top pin extending through the top hole of the pair of link plates and being freely rotatable within the link plates, the top pin further having a substantially hourglass shaped medial groove, a base, including two piers, with each pier of the pair of piers receiving an end of the load cell, with each pier having a cut-out on a side of each pier facing a center of the load cell, with the cut-out allowing the load cell more ability to deform, and a compression type load cell mounted on the base and having a substantially hourglass shaped medial groove, with the hourglass shaped medial groove of the top pin resting in and substantially matching the substantially hourglass shaped medial groove of the load cell, with the bottom pin passing below the load cell, wherein the saddle is supported in a manner that allows the saddle and the weigh bridge to swing longitudinally on a combination of the top and bottom pins and the pair of link plates, and further allows the top pin to roll transversely on the medial groove of the load cell while maintaining a load force in a substantially centered position on the load cell.

The above and other features and advantages of the present invention will be further understood from the following description of the preferred embodiment thereof, taken in conjunction with the accompanying drawings.

DETAILED DESCRIPTION OF THE PREFERRED EMBODIMENTS

Figure 1A:
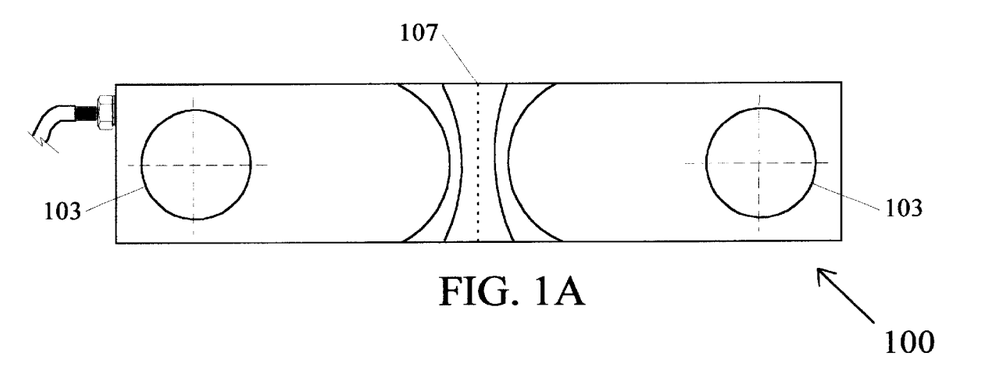
FIGS. 1A–1C show a shear beam load cell of a type used in the present invention.
Figure 1B:
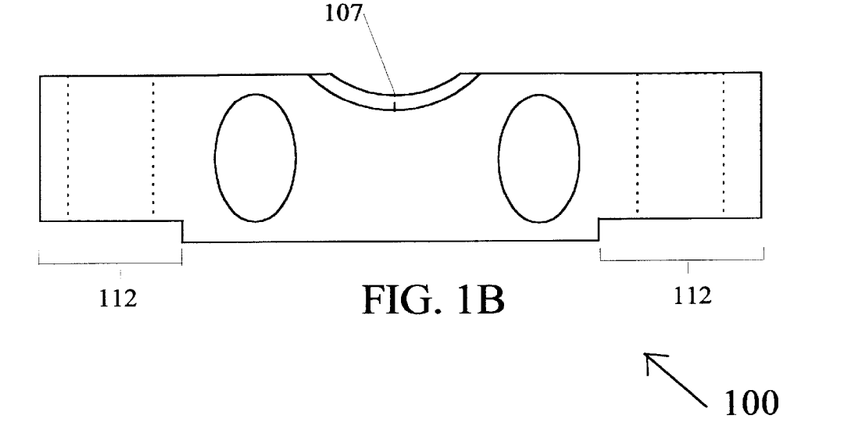
Figure 1C:
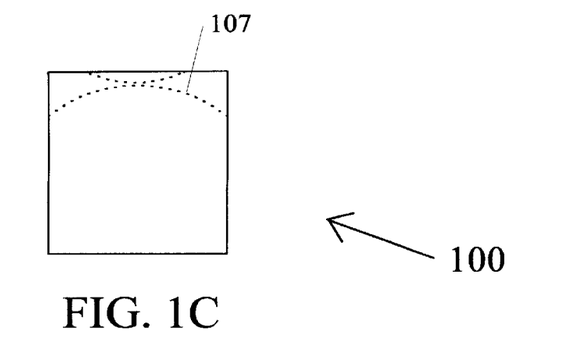

FIGS. 1A–1C show a double ended shear beam, center compression load cell 100 that is employed in the present invention. Salient features of one embodiment of the load cell 100 include the mounting holes 103, a substantially hourglass shaped medial groove 107, and end portions 112 for mounting the load cell 100. Internal to the body of the load cell 100 are strain gauges (not shown) that transmit electrical signals to an external scale unit. It should be understood that other double ended shear beam, center compression load cell configurations may be employed in the present invention.

Figure 2:
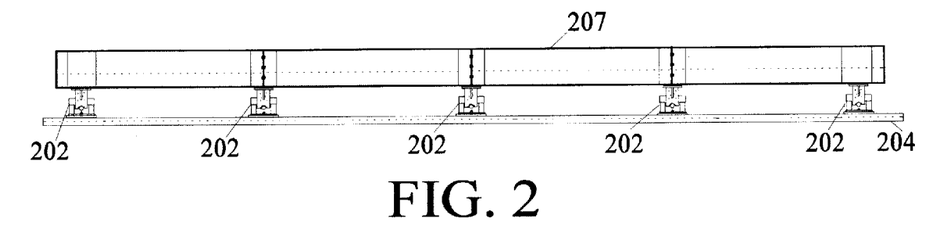
FIG. 2 shows a scale and load cell mounts.

FIG. 2 shows the overall construction of a low profile weigh bridge using the swing and roll load cell mount 202 of the present invention. As can be seen from the figure, a plurality of load cell mounts 202 may be mounted on a support surface 204, such as a concrete slab, to support the weigh bridge platform 207.

Figure 3A:
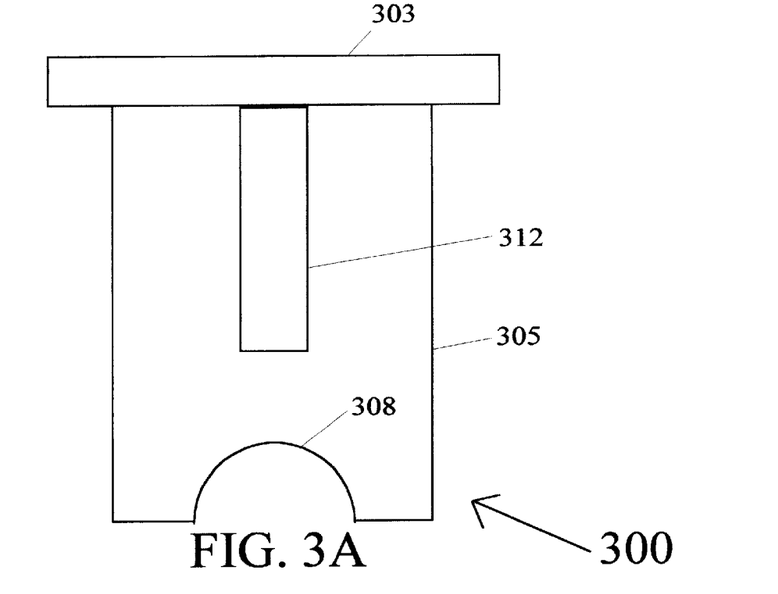
FIGS. 3A–3B show two views of a saddle of the load cell mount of the present invention.
Figure 3B:
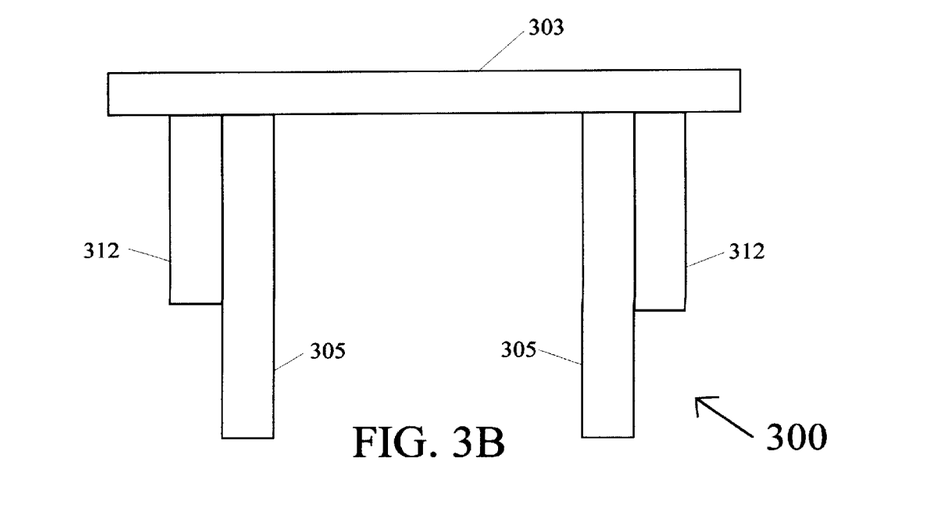

FIGS. 3A and 3B show two views of a saddle 300 of the load cell mount 202. The saddle 300 includes an upper surface 303, a pair of downwardly extending arms 305 having substantially semi-circular cut-outs 308, and strengthening ribs 312. The saddle 300 is an upper component of the swing and roll load cell mount 202 that is affixed to the weigh bridge platform 207. The saddle 300 may be affixed to the weigh bridge platform 207 by bolts or other fasteners, or by welds. As will be appreciated below, the swing and roll load cell mount 202 is self-centering. As a result of this self-centering ability, the load cell mount 202 has a great advantage in that it does not require that the support surface 204 be exactly level.

In the preferred embodiment, the saddle 300 is made of a high strength steel, such as, for example, grade A36 steel, unhardened. Alternatively, other types of steel may be employed, and may be hardened in a conventional manner if desired. The only choice limitation on the material used for the saddle 300 is that the saddle 300 must be of a material that will not wear easily, especially in the area of the cut-outs 308.

Figure 4:
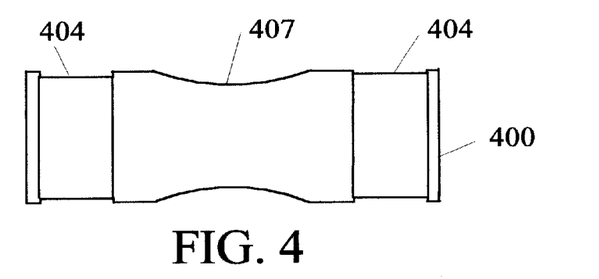
FIG. 4 shows a top pin of the load cell mount of the present invention.

FIG. 4 shows a top pin 400 of the present invention. The top pin 400 includes a substantially hourglass shaped medial groove 407 and two portions of reduced diameter 404. In the preferred embodiment, the portions of reduced diameter 404 are one-sixteenth of an inch in depth, but alternatively may be varied as needed. The substantially hourglass shaped medial groove 407 of the top pin 400 matches the substantially hourglass shaped medial groove 107 of the load cell 100. The actual point of contact on the center point of the load cell 100 (commonly called the "sweet spot"), is about the size of a dime, and is positioned on the center compression point of the load cell 100. The unique design of the load cell mount 202 maintains the contact between the top pin 400 and the load cell 100 at the sweet spot. This contact is substantially maintained regardless of the movement of the top pin 400.

In the preferred embodiment, the top pin 400 is one and seven-eighths of an inch in diameter, but it should be apparent that the diameter of the top pin 400 may be varied to accommodate the material of the top pin 400 and the load. In the preferred embodiment, the top pin 400 is made of a high strength steel, such as, for example, 4140 steel, hardened to Rockwell 37 or Rockwell 38 hardness. In a lesser preferred embodiment, the hardness may range from a hardness of Rockwell 25 to Rockwell 50. Alternatively, other types of metal may be employed, and may be hardened in any desired manner. The only limitation on the material is that the top pin 400 must be strong and will not wear easily, especially in the two portions of reduced diameter 404 and in the medial groove 407.

Figure 5:
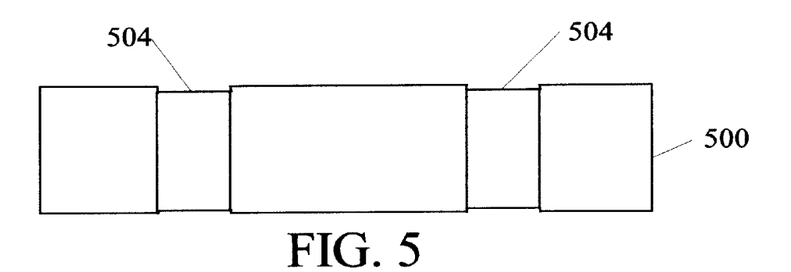
FIG. 5 shows a bottom pin of the load cell mount of the present invention.

FIG. 5 shows a bottom pin 500 of the present invention. The bottom pin 500 includes two portions of reduced diameter 504. In the preferred embodiment, the portions of reduced diameter 504 are one-sixteenth of an inch in depth, but alternatively may be varied as needed. In the preferred embodiment, the bottom pin 500 is one and seven-eighths of an inch in diameter, but it should be apparent that the diameter of the bottom pin 500 may be varied to accommodate the the material of the bottom pin 500 and the load. In the preferred embodiment, the bottom pin 500 is made of a high strength steel, such as, for example, 4140 steel, hardened to Rockwell 37 or Rockwell 38 hardness. In a lesser preferred embodiment, the hardness may range from a hardness of Rockwell 25 to Rockwell 50. Alternatively, other types of metal may be employed, and may be hardened in any desired manner. The only limitation on the material is that the bottom pin 500 must be strong and will not wear easily, especially in the two portions of reduced diameter 504.

Figure 6:
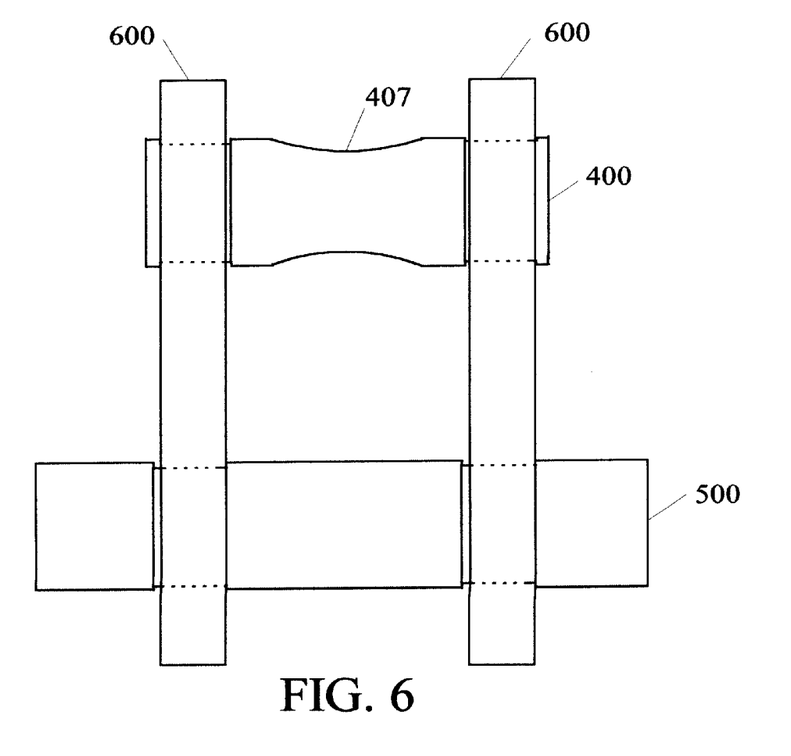
FIG. 6 shows an end view of a partial assembly of the load cell mount of the present invention.

FIG. 6 shows an end view of a partial assembly of the load cell mount 202 of the present invention. The partial assembly includes the top pin 400, the bottom pin 500, and a pair of link plates 600.

Figure 7:
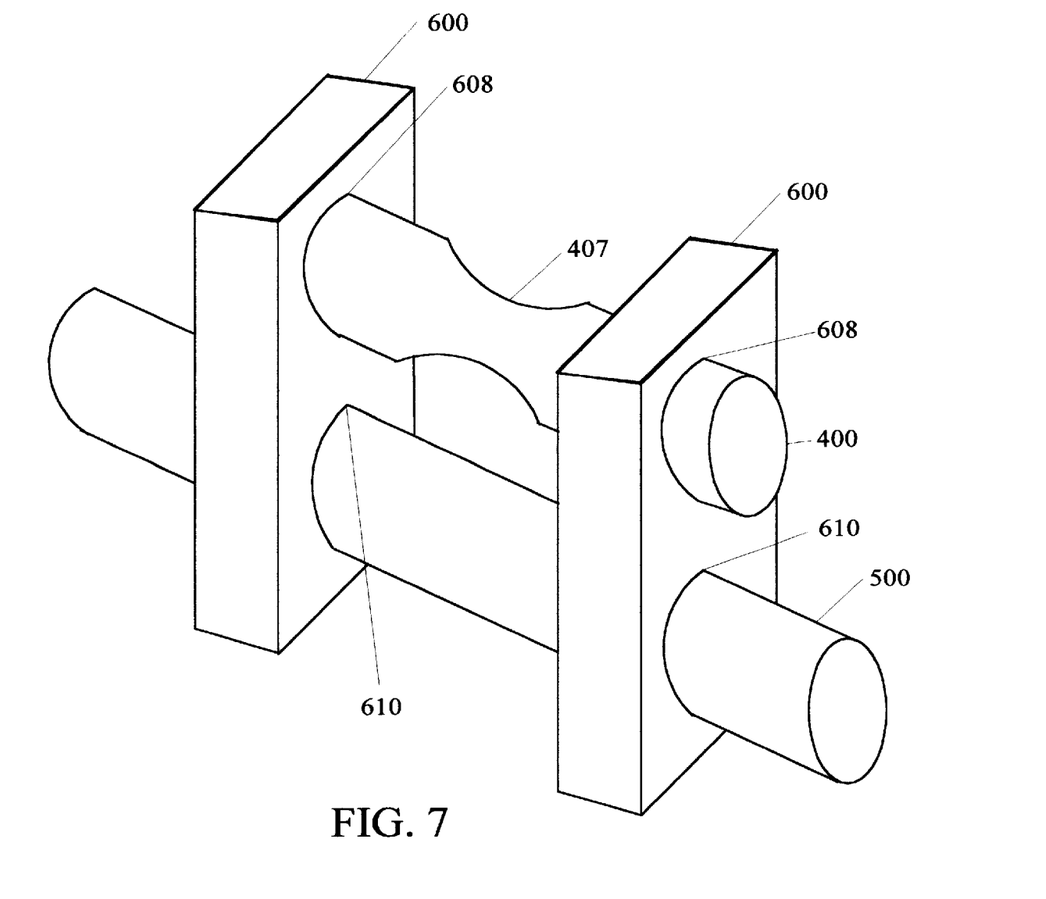
FIG. 7 shows an axonometric view of a partial assembly of the load cell mount of the present invention.

FIG. 7 shows an axonometric view of the partial assembly. The link plates 600 in the preferred embodiment are substantially rectangular in shape, but maybe oval, irregular, or any other shape as desired. The link plates 600 each include a top hole 608 and a bottom hole 610. The top pin 400 passes through the top holes 608 of the link plates 600, with the portions of reduced diameter 404 of the top pin 400 residing in the top holes 608. The bottom pin 550 passes through the bottom holes 610 of the link plates 600, with the portions of reduced diameter 504 of the bottom pin 500 residing in the bottom holes 610. Both the top pin 400 and the bottom pin 500 can freely rotate in the link plates 600. The portions of reduced diameter 404 and 504 not only allow the top pin 400 and the bottom pin 500 to rotate freely in the link plates 600, but also retain the top pin 400 and the bottom pin 500 within the link plates 600 and maintain the link plates 600 in spaced relation.

In the preferred embodiment, the link plates 600 are made of one inch thick plates of a high strength steel, such as, for example, 4140 steel, hardened to Rockwell 37 or Rockwell 38 hardness. In a lesser preferred embodiment, the hardness may range from a hardness of Rockwell 25 to Rockwell 50. Alternatively, other types of metal may be employed, and may be hardened in any desired manner. The only limitation on the material is that the link plates 600 must be strong and will not wear easily, especially in the areas of the top and bottom holes 608 and 610.

Figure 8:
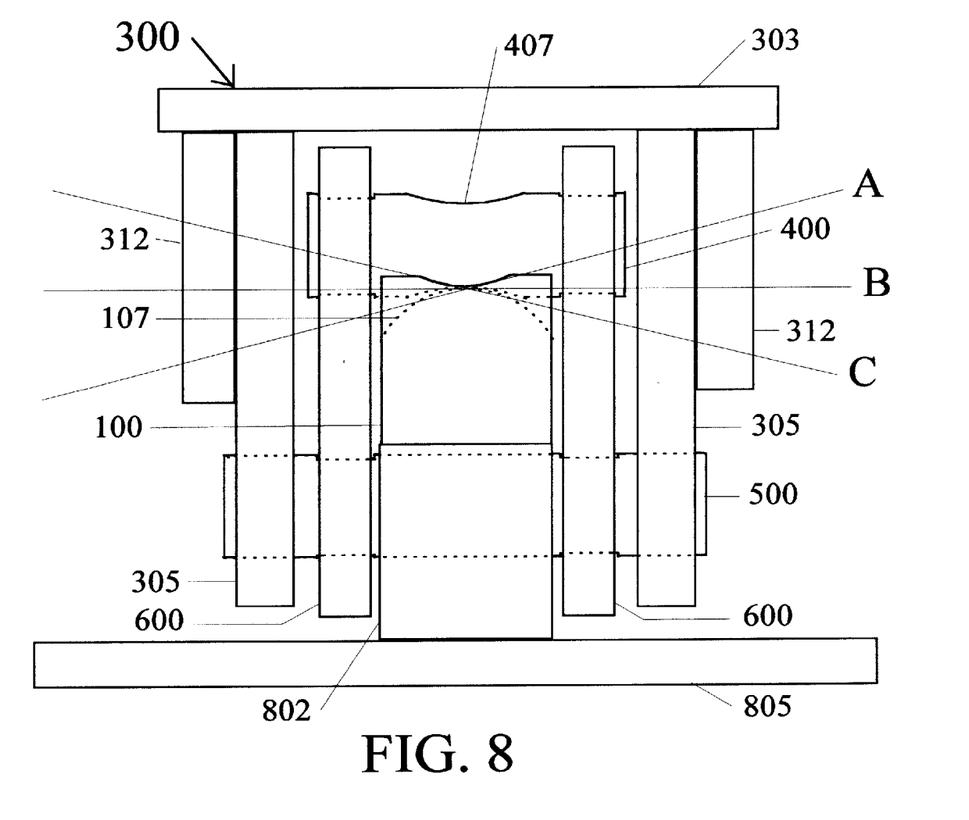
FIG. 8 shows an end view of the load cell mount of the present invention.

FIG. 8 shows an end view of the fully assembled load cell mount 202 of the present invention. This figure illustrates the configuration of the saddle 300 in relation to the top pin 400, the bottom pin 500, the link plates 600, and the load cell 100. Also included in the load cell mount 202 are a base plate 805 and piers 802. This figure shows the rolling capability of the swing and roll load cell mount 202. Reference lines A, B, and C show how the top pin 400, and indirectly the link plates 600 and the saddle 300, may roll on the medial groove 107 of the load cell 100. Therefore, in the presence of a force to the left or right (in relation to the figure), the load cell mount 202 may roll on the load cell 100.

The piers 802 are affixed to the base plate 805, and the base plate 805 in turn is mounted to the support surface (not shown). The weigh bridge platform 207 is supported by, and attached to, the upper surface 303 of the saddle 300. The attachment may be by, for example, bolts or other fasteners, welds, etc. The weight of a load and the weigh bridge 207 is transmitted through the arms 305 of the saddle 300 and onto the bottom pin 500. As can be seen from FIG. 9, the cut-outs 308 of the arms 305 rest on the bottom pin 500. The cut-outs 308 allow the bottom pin 500 to move with respect to the arms 305 in the presence of any sway, while yet forcing the arms 305 to return to a centered position on the bottom pin 500 in the absence of any sway. The weight transferred to the bottom pin 500 is further transferred to the side links 600, which transfer the weight to the top pin 400. Therefore, the combined weight of the weigh bridge platform 207 and any load on the platform is transferred to the top portion of the load cell 100.

Figure 9:
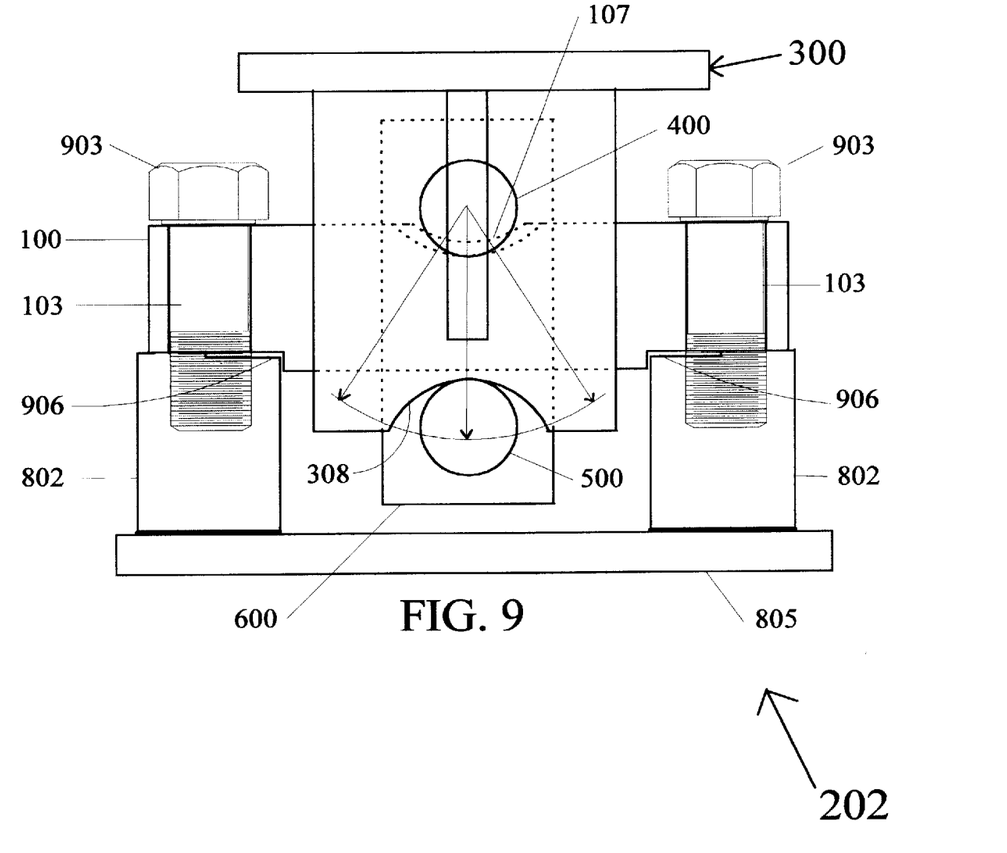
FIG. 9 shows a side view of the load cell mount of the present invention.

FIG. 9 shows a side view of the fully assembled load cell mount 202 of the present invention. The main components remain the same, with the addition of fasteners 903, which fasten the load cell 100 to the piers 802. The fasteners 903 in the preferred embodiment are one inch diameter, grade 8 bolts, but alternatively may be any other type of suitable fastener.

FIG. 9 shows the swinging action of the load cell mount 800, wherein the link plates 600 may swing about the top pin 400 as the saddle 300 sways in a left to right motion. The saddle 300 and the load cell 100 do not move, while the top pin 400 may roll or otherwise move in the medial groove 107 of the load cell 100. Likewise, the bottom pin 500 may roll or otherwise move in the cut-out 308 of the side arms 305 of the saddle 300. As can be seen from the figure, the bottom pin 500 extends transverse to and below the load cell 100. The distance between the load cell 100 and the bottom pin 500 will determine how far the load cell mount 202 is capable of swinging. If the link plates 600 locate the bottom pin 500 relatively close to the load cell 100, the bottom of the load cell 100 may act as a stop and may prevent the load cell mount 202 from swinging unchecked. This stopping function is an additional benefit of the present invention, as no additional hardware is needed, nor is adjustment necessary. Of course, this stopping action is not absolute. The top pin 400 may climb in the medial groove 107 of the load cell 100 and the bottom pin 500 may climb in the cut-outs 308 of the saddle 300.

Another noteworthy feature of the load cell mount 202 is the cut-out portion 906 of the two piers 802. Because of the cut-out portion 906, the load cell 100 has more ability to deform under load, and the accuracy and capacity of the load cell 100 are improved by mounting the load cell 100 on the piers 802 in such a manner that deformation is less impeded.

An additional benefit of the load cell mount 202 of the present invention is an improved ability of the load cell mount 202 to tolerate irregularities in the installation of the mount. In related art mounts, having a completely level and smooth support surface on which to install a load cell mount was very important. Having a proper transferral of weight onto a load cell of the related art depended to some extent on having the load cell mount perfectly positioned. The self-centering capability of the present invention eliminates these concerns, and allows the load cell mount 202 of the present invention to be installed without the need for a perfect surface, and without the need for anchor bolts precisely located in the support surface 204. For effective and reliable operation, the load cell mount 202 can be properly positioned and installed by the use of leveling bolts. When leveling bolts are used for installation, a one to two degree slope in the support surface 204 may be accommodated, so that drainage of the scale may be achieved. In addition, mounting bolts can be drilled and installed in a pre-existing support surface 204.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A swing and roll load cell mount, comprising:
   a weigh bridge;
   a saddle mounted to said weigh bridge, said saddle having an upper surface adapted for attachment to said weigh bridge, and having a pair of downwardly extending arms having substantially semi-circular cut-outs in bottom edges of said arms;
   a bottom pin on which said cut-outs of said arms rest, said arms being freely rotatable on said bottom pin;
   a pair of link plates having a top hole and a bottom hole, with said bottom pin extending through said bottom hole of said pair of link plates and being freely rotatable within said link plates, with said link plates being spaced apart;
   a top pin, said top pin extending through said top hole of said pair of link plates and being freely rotatable within said link plates;
   a base; and
   a compression load cell mounted on said base and having a substantially hourglass shaped medial groove, with said top pin resting in said medial groove of said load cell and said bottom pin passing below said load cell;
   wherein said saddle is supported in a manner that allows said saddle and said weigh bridge to swing longitudinally on a combination of said top and bottom pins and said pair of link plates, and further allows said top pin to roll transversely on said medial groove of said load cell while maintaining a load force in a substantially centered position on said load cell.

2. The swing and roll load cell mount of claim 1, wherein said top pin further includes a substantially hourglass shaped medial groove.

3. The swing and roll load cell mount of claim 2, wherein said hourglass shaped medial groove of said top pin substantially matches said hourglass shaped medial groove of said load cell.

4. The swing and roll load cell mount of claim 1, wherein said base further includes two piers, with each pier receiving an end of said load cell.

5. The swing and roll load cell mount of claim 4, wherein each pier of said two piers has a cut-out on a side of said each pier facing a center of said load cell, wherein said cut-out allows said load cell more ability to deform.

6. The swing and roll load cell mount of claim 1, wherein said top and bottom pins have portions of a reduced diameter whereby said top and bottom pins are retained in said pair of link plates.

7. The swing and roll load cell mount of claim 6, wherein said link plates are retained by said reduced diameter portions of said top and bottom pins.

8. The swing and roll load cell mount of claim 1, wherein a self-centering capability of said swing and roll load cell mount removes a need for an exactly level base for said weigh scale.

9. The swing and roll load cell mount of claim 1, wherein any motion imparted to said weigh scale is absorbed by a resulting motion of said load cell mount.

10. The swing and roll load cell mount of claim 1, wherein said top pin is not forced to rotate on said load cell when said load cell mount swings.

11. A swing and roll load cell mount for a weigh scale, comprising:

a weigh bridge;

a saddle mounted to said weigh bridge, said saddle having an upper surface adapted for attachment to said weigh bridge, and having a pair of downwardly extending arms having substantially semi-circular cut-outs in bottom edges of said arms;

a bottom pin on which said cut-outs of said arms rest, said arms being freely rotatable on said bottom pin;

a pair of link plates having a top hole and a bottom hole, with said bottom pin extending through said bottom hole of said pair of link plates and being freely rotatable within said link plates, with said link plates being spaced apart;

a top pin, said top pin extending through said top hole of said pair of link plates and being freely rotatable within said link plates, said top pin further having a substantially hourglass shaped medial groove;

a base, including two piers, with each pier of said pair of piers receiving an end of said load cell, with each said pier having a cut-out on a side of said each pier facing a center of said load cell, with said cut-out allowing said load cell more ability to deform; and a compression load cell mounted on said base and having a substantially hourglass shaped medial groove, with said hourglass shaped medial groove of said top pin resting in and substantially matching said hourglass shaped medial groove of said load cell, with said bottom pin passing below said load cell;

wherein said saddle is supported in a manner that allows said saddle and said weigh bridge to swing longitudinally on a combination of said top and bottom pins and said pair of link plates, and further allows said top pin to roll transversely on said medial groove of said load cell while maintaining a load force in a substantially centered position on said load cell.

12. The swing and roll load cell mount of claim 11, wherein said top and bottom pins have portions of a reduced diameter whereby said top and bottom pins are retained in said pair of link plates.

13. The swing and roll load cell mount of claim 12, wherein said link plates are retained by said reduced diameter portions of said top and bottom pins.

14. The swing and roll load cell mount of claim 11, wherein a self-centering capability of said swing and roll load cell mount removes a need for an exactly level base for said weigh scale.

15. The swing and roll load cell mount of claim 11, wherein any motion imparted to said weigh scale is absorbed by a resulting motion of said load cell mount.

16. The swing and roll load cell mount of claim 11, wherein said top pin is not forced to rotate on said load cell when said load cell mount swings.

* * * * *